March 17, 1959     C. C. SCHNEIDER     2,877,498
PROCESS FOR THE MANUFACTURE OF HOLLOW ARTICLES FROM RESIN
IMPREGNATED CELLULOSIC MATERIALS
Filed Oct. 18, 1954

Inventor
Caspar C. Schneider
By his attorneys
Howson and Howson.

2,877,498

PROCESS FOR THE MANUFACTURE OF HOLLOW ARTICLES FROM RESIN IMPREGNATED CELLULOSIC MATERIALS

Caspar C. Schneider, Staten Island, N. Y.

Application October 18, 1954, Serial No. 462,646

3 Claims. (Cl. 18—47.5)

This invention relates to an improved process for making resin impregnated cellulosic materials.

The desirability of manufacturing synthetic resin impregnated cellulosic materials has long been recognized. Such materials may be used for food containers including hollow articles such as cups, casseroles, and dishes, or as containers for various other types of products ranging from cosmetics to greased packed bearings. In general they are useful wherever a disposable container resistant to heat and impervious to grease and oil is desired.

Processes and apparatus for manufacturing such materials and articles have been described in certain United States patents to the late Lee M. Wiley, Numbers 2,296,889; 2,337,581; 2,348,272; 2,348,871; 2,354,564; 2,377,392; 2,377,393; 2,395,703; 2,415,925; and 2,427,036.

According to the Wiley process which has been found most practical cellulose pulp is impregnated with an aqueous dispersion of a suitable thermosetting or heat hardenable resin and the paper, while still wet from the impregnating dispersion is forced into a series of unheated molds in which it is roughly shaped in the desired form. The rough articles are then passed through an oven where curing of the resin is begun. Following this preliminary cure, the articles are transferred to hot molds where the cure is completed.

Satisfactory articles have been made by this method. However, as a practical matter the method has certain defects which are a serious handicap to commercial production.

Thus, where the pulp is fed to molds directly as it comes from the impregnating bath, the dispersion is squeezed out in molding and fouls the molds and other pieces of equipment, particularly the so-called "gathering rings" which pleat the pulp sheet to permit it to assume a rounded three-dimensional shape. Production must be stopped and the fouled equipment cleaned by hand, with consequent loss of time and increase in cost.

Moreover, in the squeeze out which occurs in molding the wet pulp, about 50% of the resin present in the dispersion is lost. Since the resin represents a major factor in the cost of materials, this loss is highly significant economically.

Finally, the necessity for both heated and non-heated molds and for the extensive drying and curing equipment interposed between the hot and cold molding stages, demands a very large capital investment, limits flexibility of operation, and increases maintenance costs.

According to the present invention, these and other drawbacks of present processes are overcome by a controlled drying of the impregnated pulp before molding. This drying is limited to retain sufficient water in the pulp so that the impregnated pulp is still plastic enough to be molded after the drying operation. Preferably, all the water in excess of this amount is removed.

The amount of water which is retained in the pulp after drying will depend on the characteristics of the paper, the characteristics of the resin and other solids present in the dispersion, the amount of solids picked up by the paper and the concentration of solids in the dispersion. The water content will vary between about 25% and about 145% based on the weight of air dry pulp. The criterion to be used in determining the extent of drying is whether the resulting impregnated material is sufficiently plastic or workable to be molded.

It will be found that in general, the higher the concentration of resin in the dispersion, the greater the amount of water which must be retained in the pulp to preserve plasticity.

It has been further found that as a practical matter between about 30% and about 64% by weight of the water carried by the impregnated pulp entering the drying stage should be removed in that stage, the lower percentage applying where the dispersion is relatively heavy, e. g., 50% by weight solids and the upper where dispersion is light, e. g., 20% by weight solids.

It is a characteristic and very important feature of the invention that when the impregnated pulp has been subjected to the controlled drying described above, it can be molded directly in heated molds so that shaping of the desired article and curing of the resin will take place simultaneously.

The invention therefore provides a method for manufacturing resin impregnated cellulosic material which comprises impregnating cellulose pulp with an aqueous dispersion of a heat hardenable synthetic resin, drying the impregnated pulp until only enough water is retained in the pulp to permit molding thereof and curing the resin in the impregnated pulp.

The invention further provides a method for manufacturing resin impregnated cellulosic articles which comprises impregnating cellulose pulp with an aqueous dispersion of a heat hardenable synthetic resin, drying the impregnated pulp until only enough water is retained in the pulp to permit molding thereof and molding and curing the impregnated pulp.

Various methods may be used to dry the impregnated pulp, taking care not to cure the resin. It has been found desirable, however, to accomplish the drying by passing the impregnated pulp through an oven at a temperature between about 120° F. and the boiling point of water, preferably at a temperature between about 180° F. and about 200° F. The time necessary for the water content of the pulp to reach the desired amount will vary, depending on the amount of water originally present, the resin, the pulp, and the degree of heat used.

As pointed out, the impregnated semi-dry pulp may be transferred directly to hot molds where it is molded and cured in the same operation. The time and temperature of cure will vary with the type of resin used, but in general the temperature will range between about 212° F. and about 325° F.

The resinous dispersions used in the present process may be selected from a wide variety of formulations. They are in general aqueous dispersions containing at least one heat hardenable synthetic resin, such for example as a melamine-formaldehyde, urea-formaldehyde or phenol-formaldehyde resin. Other resinous materials may be present in addition, such for example as polystyrene, polyvinyl chloride, vinylidine chloride, or acrylic resins. Where a glossy finish is desired high melting waxes may be added to the formulation.

It will be clear that the type of dispersion used in the process will be determined by the use to which the finished article will be put. Thus, for example, a casserole designed to hold food during cooking will require a quite different formulation, than a container for shoe polish. While the particular type of resins used in the aqueous dispersion are not a part of the present invention, an especially suitable formulation is that disclosed and claimed in my copending application Serial No. 454,831, filed September 8, 1954. These formulations consist essentially of between about 5 and about 25% by weight of a melamine formaldehyde resin having a mol ratio of melamine to formaldehyde of about 1:2, between about 0.3 and about 14% by weight colloidal silica, and between about 3 and about 12% by weight polystyrene, the balance consisting essentially of water.

The solids content of the dispersion will vary with the amount of solids desired in the finished product and with the type of resin used. In general, however, it has been found impractical to use dispersions containing less than 20% solids. The upper limit on solids content is simply the amount of solids which can be maintained in a uniform dispersion for a sufficiently long time to permit commercially feasible operation. With most formulations this upper limit is around 50% solids.

The amount of solids present in the finished material will vary with the use for which the material is intended, but will in general be between about 15% and about 50%, based on the weight of the finished material.

The pulp used in the present process is cellulose pulp, usually but not necessarily wood pulp. The dimensions of the pulp will of course depend on the article to be manufactured, and the use to which that article is to be put.

The time of immersion of the pulp in the impregnating solution is adjusted along with the solids content of the dispersion, to give the total solids pick-up required in the finished article. Care must be taken to remove the pulp from the impregnating solution before it has absorbed so much liquid that it will begin to disintegrate.

The drying apparatus employed may be of any convenient type using radiant heat or a current of hot dry air or other gas preferably moving countercurrent to the pulp being dried.

As pointed out above, curing of the resin carried by the semi-dry pulp may be done as the pulp is molded in heated molds. The conditions of time and temperature at which this is carried out will depend entirely upon the characteristics of the resin or resins which are to be cured. Usually the molds will be maintained between about 212° F. and about 325° F. They may be heated to higher temperatures if the particular resin to be cured requires higher temperatures.

It is, of course, possible that a minor amount of curing may be effected in the drying stage. However, this is held to a minimum, to prevent stiffening of the pulp and loss of molding ability. It is considered that by far the greater portion of heat furnished the wet pulp during the drying period is taken up by evaporation of water.

The invention will be further described with reference to the accompanying drawing which is included solely for purposes of illustration and is not to be taken as restricting the invention in any way beyond the scope of the appended claims.

Figure 1:
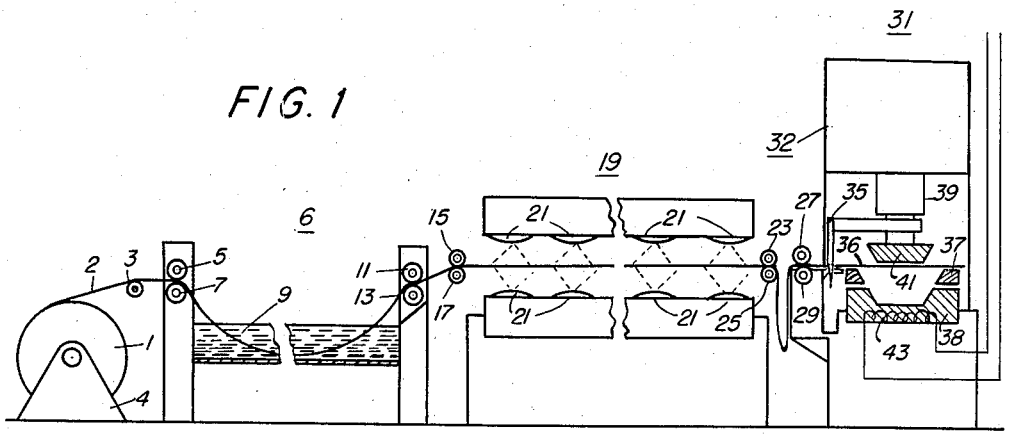
Fig. 1 is a schematic view of apparatus suitable for carrying out the invention showing the novel sequence of steps.

Referring first to Fig. 1, a web of prime pulp 2, is drawn off a roll 1, supported on a stand 4, and passed through two rollers 5 and 7 into a tank 6 containing aqueous dispersion 9 of a heat hardenable resin. Upon emerging from the dispersion 9, the web is passed through squeeze rollers 11 and 13 where a certain amount of excess dispersion is removed leaving sufficient dispersion, however, so that the amount of solids remaining is equal to the solids content required in the finished article. The web, now impregnated with the dispersion is carried between rolls 15 and 17 and into an oven 19, maintained at a temperature between about 120° F. and about the boiling point of water by a series of infra red lamps 21. Under this heat the web loses between about 30% and about 64% of the water which it had upon entering the oven 19, but retains between about 25% and about 145% water, based on the weight of the air dry pulp. The web is carried out of the oven 19 on rolls 23, 25, 27, and 29 and fed to a press assembly 31.

The press assembly 31 is preferably hydraulically operated and comprises a frame 32 and a plunger 39 with which is associated a male die 41, female die or mold 38 and a "gathering ring" 37. The "gathering ring" as pointed out above, serves to pleat the sheet of pulp, enabling it to assume a three-dimensional shape. Details of the "gathering ring" are not a part of this invention. One suitable type is described in the patent to Lee M. Wiley No. 2,296,889.

The press assembly 31 is further fitted with a guillotine 35 which serves to sever segments 36 of the web 2 suitable for forming the individual articles desired.

In operation, portions of the web 2 are drawn intermittently into the press assembly 31 by rollers 27, 29. Plunger 39 and guillotine 35 then descend, the guillotine severing a suitable segment or blank 36 from web 2. The plunger 39 with its associated male die 41 force the segment through gathering ring 37 and into female die 38.

The female die 38 is heated, as for example by a heating coil 43. The impregnated blank remains in die 38 under pressure of male die 41 until the resin in it has been cured, or preferably is transferred to some other press (not shown) in which both the male and the female dies are heated for completion of the cure. In this way the press assembly 31 can be used for another blank.

It should be understood that although in Fig. 1 the web 2 is shown as being fed directly from the drying oven 19 to a press assembly 31, this is not necessary, and in practice it is often desirable to impregnate a large quantity of pulp, dry it to the desired moisture content, and then store it under carefully controlled conditions of temperature and humidity until it is desired to complete the molding operation.

Figure 2:
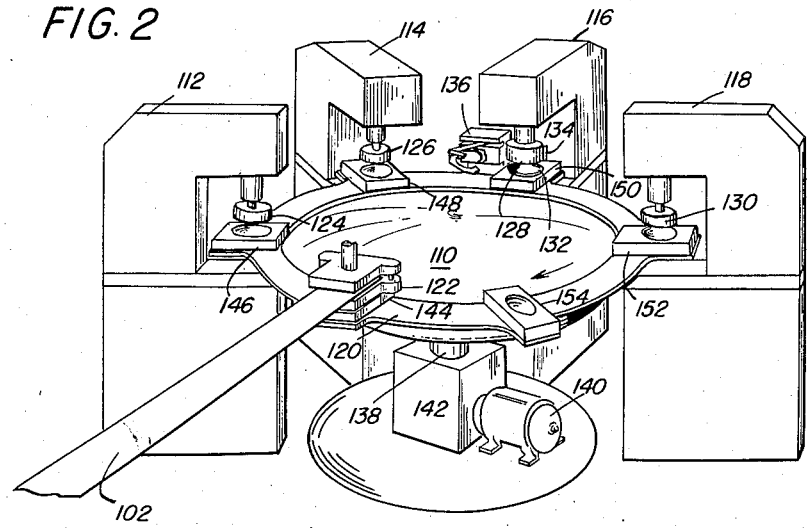
Fig. 2 is a perspective view of a preferred press arrangement for forming articles according to the novel process.

A preferred arrangement of presses for carrying out the molding operation is shown in Fig. 2.

In the arrangement of Fig. 2 a series of presses 110, 112, 114, 116, and 118 are arranged about a rotating table 120. The press 110 is not fully shown but is similar in construction to the press assembly 31 of Fig. 1 in that it comprises a frame, a guillotine and a male die, none of which is shown in Fig. 2, as well as a "gathering ring" 122.

Presses 112, 114, 116, and 118 all have male dies 124, 126, 128, and 130. The male die 128 of press 116 is fitted with a cutting edge 132 and side blade 134 to trim excess pulp from the blank or segment of pulp being molded. A scavenger 136 removes the severed trim.

The male dies of presses 112, 114, 116 and 118 are heated by any convenient means.

Table 120 is rotated intermittently about post 138 by motor 140 and timer 142. Table 120 is provided with six female molds or dies 144, 146, 148, 150, 152, and 154, all of which are heated by any convenient means.

In operation a web of pulp 102 is fed into the press 110 where a blank is severed and forced through gathering ring 122 into mold 144. At the same time, male dies 124, 126, 128, and 130 of presses 112, 114, 116, and 118, descend into dies 146, 148, 150, and 152 which contain blanks from previous cycles. After a suitable dwell, the male dies of all presses are raised and table 120 moves ⅙ of a revolution, bringing female mold 144 to press 112, mold 146 to press 114, mold 148 to press 116, mold 150 to press 118 and mold 152 to a position between press 118 and press 110, where the finished article may be removed by hand or by any suitable mechanism (not shown).

The number of presses used may vary between wide limits and will depend on the curing time of the resin and the rate of production desired.

Various modifications may be made in the apparatus shown, which has been described solely for purposes of illustration. While the arrangements of presses described is highly satisfactory, it is obvious that other combinations might be used without in any way departing from the invention.

The invention will be further illustrated by the following examples:

Example I

Following the procedure generally outlined in connection with Fig. 1, a strip of 28 point prime pulp was fed into a dispersion prepared in accordance with my copending application Serial No. 454,831, filed September 8, 1954, and comprising

| | Parts by weight |
|---|---|
| Melamine formaldehyde resin having a mol ratio of melamine to formaldehyde of about 1:2 and a mol weight of about 350 to 400 | 15 |
| Colloidal silica (an aqueous suspension containing 30% $SiO_2$) | 35 |
| Polystyrene (a 30% aqueous dispersion of a polystyrene having a mol weight of about 200,000) | 20 |
| Distilled water | 30 |

The material was squeezed lightly to give a total pickup of 140% on the weight of air dry pulp and then dried at a temperature of about 175° F. until about 60% of the water originally picked up was removed. It was then molded to the shape of a casserole in a mold maintained at 325° F. for a period of 10 seconds. A smooth white product impervious to water and grease resulted.

Example II

The procedure of Example I was followed except that the impregnating dispersion consisted of:

| | Percent by weight |
|---|---|
| Melamine-formaldehyde resin having a mol ratio of melamine to formaldehyde of 1:2 and a mol weight of 350/400 | 21.0 |
| Saran latex F122–A15 (a 52% aqueous dispersion of vinylidine chloride-acrylonitrile copolymer, plasticized by about 15% dibutyl phthalate) | 27.0 |
| Ammonia (28.4% aqueous solution) | 0.5 |
| Distilled water | 51.5 |

The total pickup from the impregnating dispersion was 260%. About 50% of the water picked up was removed in the oven which was operated at 170° F. The cure was conducted at 325° F. for 12 seconds. A hard smooth product resulted, which was, however, somewhat less white than the product of Example I.

It will be appreciated that many different formulations other than those described above may be used in the processes of the present invention and that the invention is not by any means limited to the use of such formulations.

What I claim is:

1. A process for manufacturing resin impregnated molded cellulosic hollow articles which comprises impregnating cellulose pulp substantially free from resinous materials with an aqueous dispersion of a heat hardenable synthetic resin, drying the impregnated pulp to the extent of reducing the water content of the impregnated pulp to a figure between about 25% and about 145% based on the weight of the air dry pulp, depending on the nature of the pulp and the resin content, said water content being only sufficient to render said pulp moldable into three dimensional hollow articles, then molding said dried impregnated pulp by means of a die and plunger at least one of which is heated into such articles and curing said resin.

2. The method claimed in claim 1 in which both the die and the plunger are heated.

3. The method claimed in claim 1 and comprising molding the impregnated pulp and curing the resin simultaneously.

References Cited in the file of this patent

UNITED STATES PATENTS

| 1,836,021 | Gibbons | Dec. 15, 1931 |
| 1,904,268 | Bronson | Apr. 18, 1933 |
| 1,956,866 | Keller | May 1, 1934 |
| 2,318,121 | Widmer | May 4, 1943 |
| 2,387,778 | Stocking | Oct. 30, 1945 |